（12） United States Patent
Xiao et al.

(10) Patent No.: US 10,091,570 B2
(45) Date of Patent: Oct. 2, 2018

(54) MINIATURE SOUND GENERATOR

(71) Applicants:Bo Xiao, Shenzhen (CN); Ronglin Linghu, Shenzhen (CN)

(72) Inventors: Bo Xiao, Shenzhen (CN); Ronglin Linghu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 24 days.

(21) Appl. No.: 15/404,699

(22) Filed: Jan. 12, 2017

(65) Prior Publication Data

US 2017/0366888 A1 Dec. 21, 2017

(30) Foreign Application Priority Data

Jun. 15, 2016 (CN) .................... 2016 2 0578727 U

(51) Int. Cl.
   H04R 9/06 (2006.01)
   H04R 1/06 (2006.01)
   H02K 41/035 (2006.01)
   H04R 7/02 (2006.01)

(52) U.S. Cl.
   CPC .......... H04R 1/06 (2013.01); H02K 41/0356 (2013.01); H04R 9/06 (2013.01); H04R 7/02 (2013.01); H04R 2400/11 (2013.01)

(58) Field of Classification Search
   CPC ...... H02K 41/0356; H02R 7/127; H04R 1/06; H04R 9/04; H04R 9/06; H04R 2400/11
   See application file for complete search history.

(56) References Cited

U.S. PATENT DOCUMENTS 5,143,169 A * 9/1992 Ziegenberg .............. H04R 7/02
                                                         181/144
2005/0254680 A1* 11/2005 Kitamura ................. H04R 1/06
                                                         381/396

\* cited by examiner

*Primary Examiner* — Brian Ensey
(74) *Attorney, Agent, or Firm* — IPro, PLLC; Na Xu

(57) ABSTRACT

A miniature sound generator includes a vibration system including a first diaphragm, a voice coil supporting and driving the first diaphragm to vibrate, and a second diaphragm arranged at one side of the voice coil far away from the first diaphragm and elastically supporting the voice coil; a fixing system fixed with the second diaphragm. The fixing system includes a frame supporting the second diaphragm and a magnetic circuit system arranged in the frame. The second diaphragm includes an insulating body and a conductive framework formed in the insulating body for electrically connecting with the voice coil and an external circuit.

6 Claims, 5 Drawing Sheets

MINIATURE SOUND GENERATOR

FIELD OF THE INVENTION

The invention is related to the technology of electroacoustic transducers, and especially relates to a miniature sound generator applying a portable mobile electronic product.

DESCRIPTION OF RELATED ART

With development of electronic technology, portable consumer electronic products are increasingly advocated, such as mobile phone, handheld game console, navigation device or multimedia entertainment handset. Such electronic products generally use a miniature sound generator for realizing high-quality music function.

An existing miniature sound generator is provided with a diaphragm made of two thin film materials to support a voice coil, and meanwhile, a voice coil lead is arranged at the short shaft sides of the voice coil to connect an external circuit.

However, the structure of the existing diaphragm cannot be directly connected with the voice coil lead, therefore, a contact terminal should be arranged on the diaphragm to connect with the voice coil lead, but it is bound to increase the weight of the whole vibration system by increasing a wiring terminal, thus, affecting the sound quality and performance of the miniature sound generator.

Therefore, it is necessary to provide an improved miniature sound generator to overcome above disadvantage.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Figure 1:
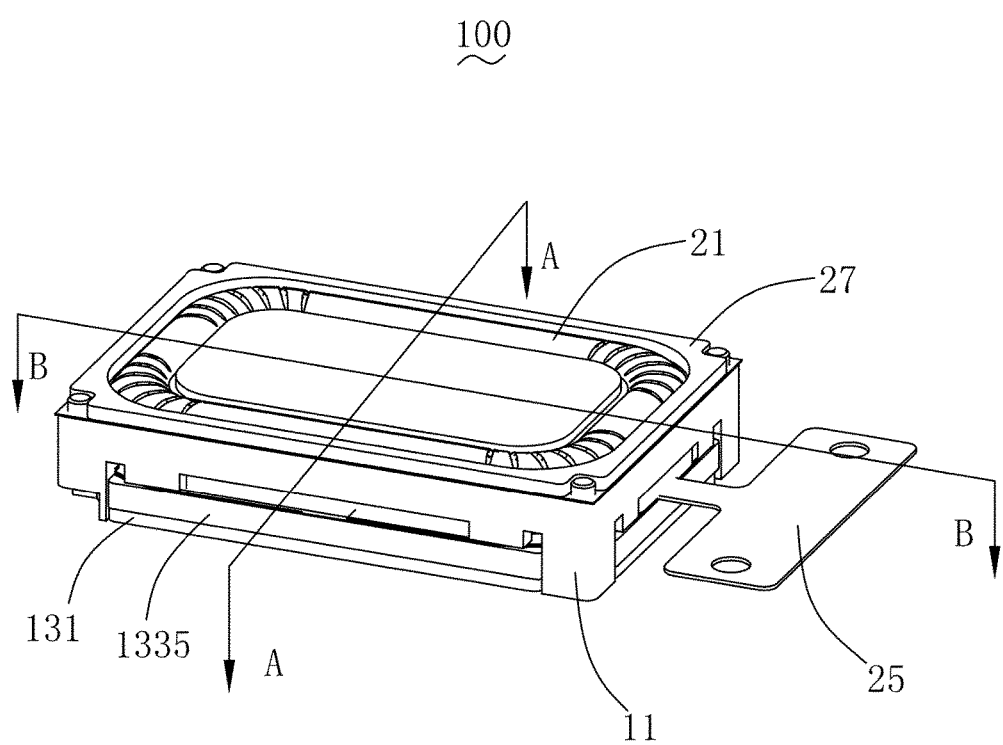
FIG. 1 is an isometric view of a miniature sound generator in accordance with a first exemplary embodiment of the present disclosure.
Figure 2:
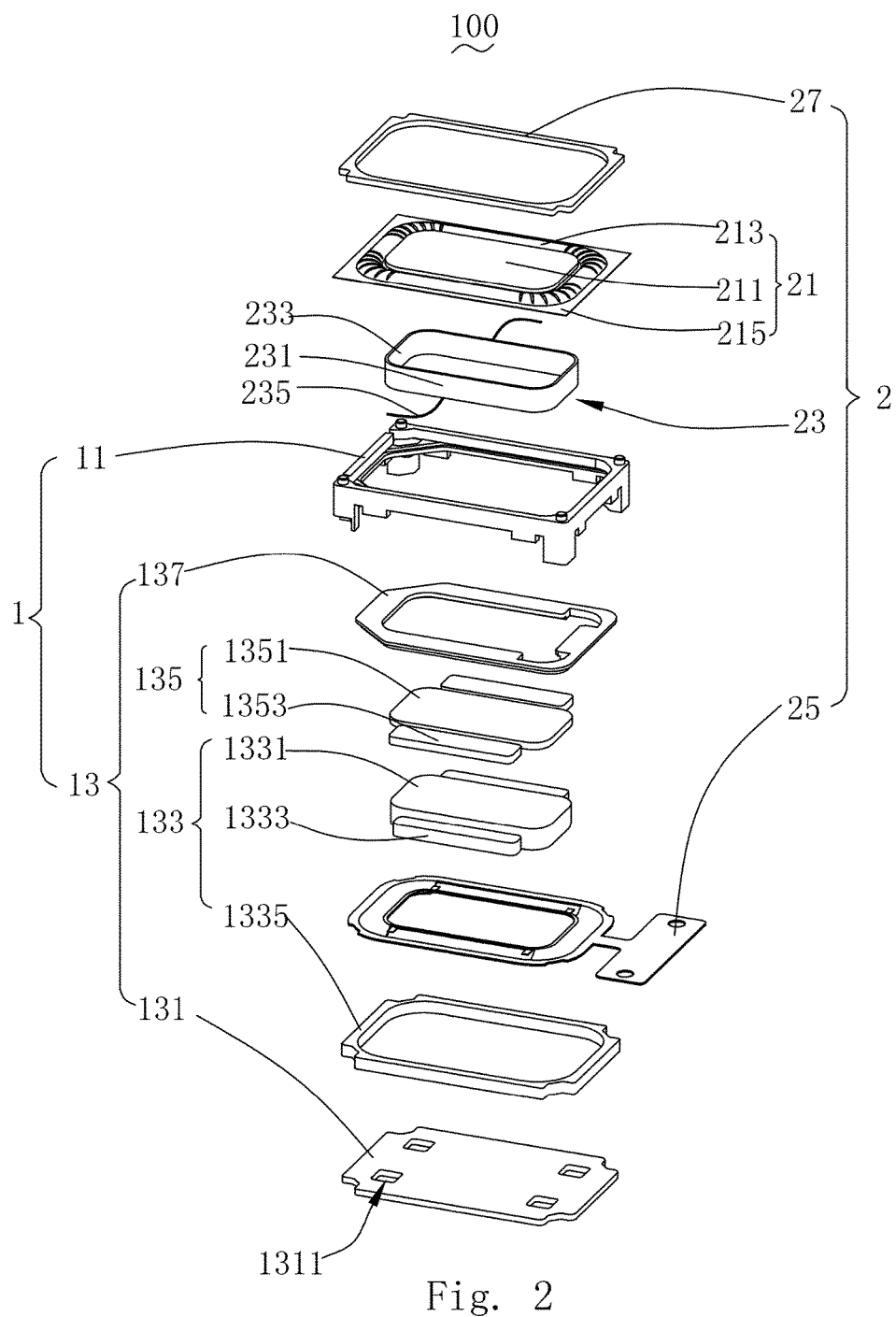
FIG. 2 is an exploded view of the miniature sound generator in FIG. 1.

As shown in FIG. 1 and FIG. 2, a miniature sound generator 100 in accordance with a first embodiment of the present disclosure, comprises a fixing system 1 and a vibration system 2. The fixing system 1 comprises a frame 11 and a magnetic circuit system 13 accommodated in the frame 11 for driving the vibration system 2 to vibrate. The vibration system 2 comprises a first diaphragm 21 fixedly connected with the frame 11, a voice coil 23 supporting and driving the first diaphragm 21 to vibrate and sound, a second diaphragm 25 arranged at one side of the voice coil 23 far away from the first diaphragm 21. The second diaphragm elastically supports the voice coil 23 and a reinforcing plate 27 overlapped on the first diaphragm 21. The second diaphragm 25 is fixed with the frame 11. The voice coil 23 comprises a pair of long shaft sides 231 arranged oppositely and a pair of short shaft sides 233 arranged oppositely, wherein the voice coil 23 is enclosed by the long shaft sides 231 and the short shaft sides 233 end to end.

Figure 3:
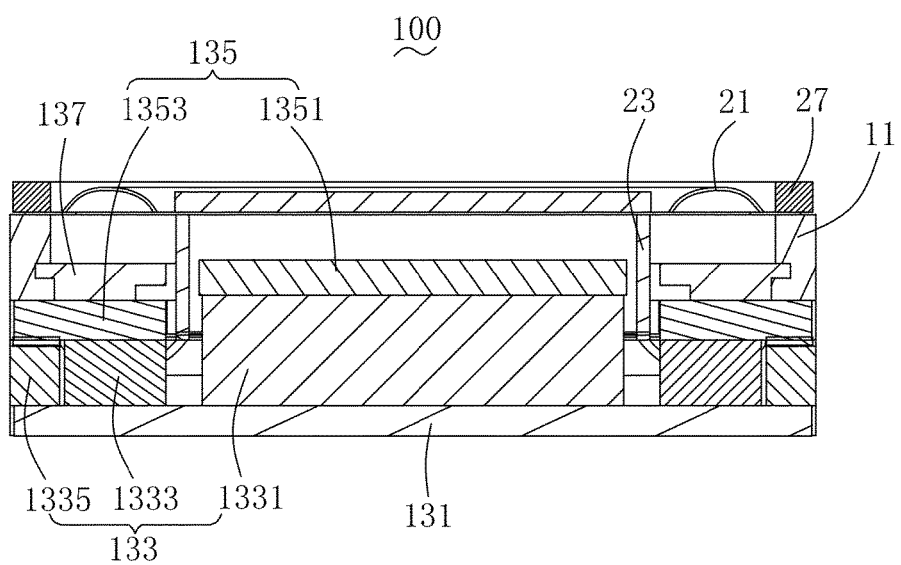
FIG. 3 is a cross-sectional view of the miniature sound generator taken along line A-A in FIG. 1.

Referring to FIG. 3, the magnetic circuit system 13 comprises a magnetic bowl 131 matched with the frame 11, a magnet 133 disposed on the magnetic bowl 131, a pole plate 135 overlapped on the magnet 133 and an upper clamping plate 137 fixed and held on the frame 11 and overlapped on the pole plate 135.

The magnetic bowl 131 is flat-shaped, matched with the frame 11 to form an accommodation space, and the magnetic bowl 131 comprises leakage holes 1311 penetrating through the magnetic bowl 131 and communicating the accommodation space with an exterior space.

The magnet 133 comprises a main magnet 1331, a pair of auxiliary magnets 1333 symmetrically arranged at two sides of the main magnet 1331, and annular magnetic conductive parts 1335 surrounding the main magnet 1331 and the auxiliary magnets 1333. Magnetic gaps are formed between the main magnet 1331 and the auxiliary magnets 1333 also between the main magnet 1331 and the annular magnetic conductive part 1335, the voice coil 23 is inserted into the magnetic gaps, the auxiliary magnets 1333 are arranged at one side of the long shaft sides 231. The pole plate 135 comprises an auxiliary pole plate 1353 and a main pole plate 1351 overlapped on the main magnet 1331, wherein one part of the auxiliary pole plate 1353 is overlapped on the auxiliary magnet 1333, and the other part thereof is overlapped on the annular magnetic conductive part 1335. The upper clamping plate 137 is flat-shaped with a through hole, and the main pole plate 1351 is arranged on the through hole of the upper clamping plate 137. Specifically, the surface of the main pole plate 1351 close to the first diaphragm and the surface of the upper clamping plate close the first diaphragm are in the same plane. The surface of the auxiliary pole plate 1553 close to the first diaphragm and the surface of the magnet 1331 close the first diaphragm are in the same plane.

Figure 4:
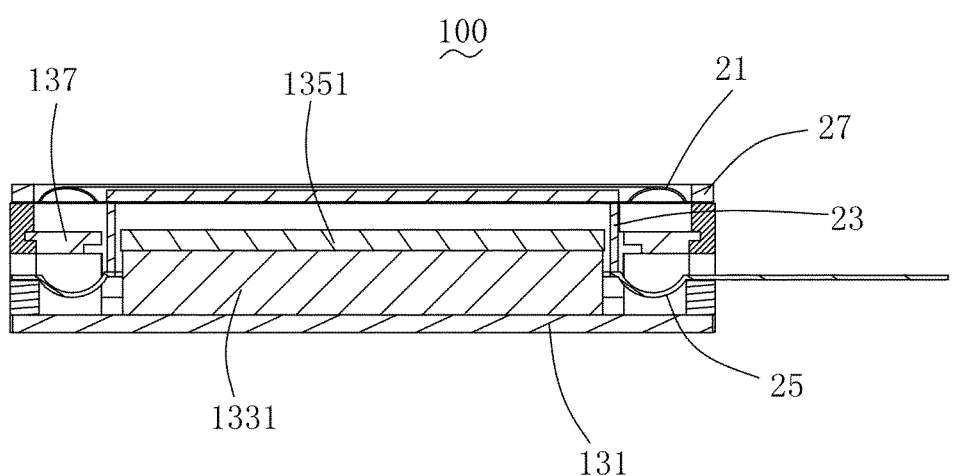
FIG. 4 is a cross-sectional view of the miniature sound generator taken along line B-B in FIG. 1.
Figure 5:
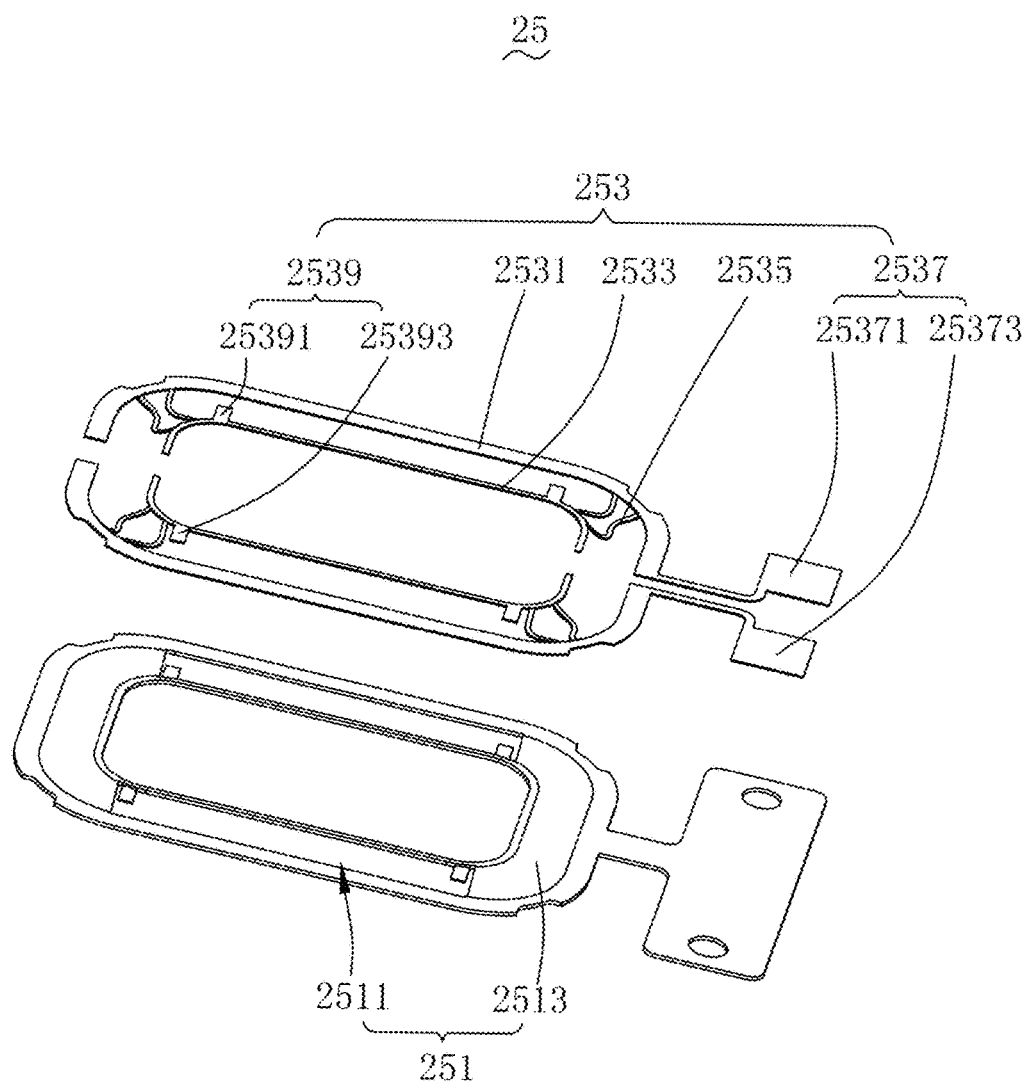
FIG. 5 is an illustration of a second diaphragm of the miniature sound generator.

Referring to FIG. 4 and FIG. 5, the first diaphragm 21 comprises a dome 211, a pleat portion 213 extended from an outer periphery of the dome 211 and a joint part 215 extended from the outer periphery of the pleat portion 213. The first diaphragm 21 is connected with the voice coil 23 and the frame 11 respectively. Specifically, the dome 211 is connected with the voice coil 23, the joint part 215 is arranged by clamping between the frame 11 and the reinforcing plate 27.

The voice coil 23 is rectangle, and arranged by clamping between the first diaphragm 21 and the flexible circuit board 25. The voice coil 23 further comprises a voice coil lead 235.

The second diaphragm 25 comprises an insulating body 251 made of silica gel materials and a conductive framework 253 made of copper foil materials. The conductive framework 253 is formed in the insulating body 251 and electrically connected with the voice coil 23 and the external circuit respectively.

The conductive framework 253 is symmetrically arranged along the direction of the long shaft of the voice coil 23, and comprises a first support part 2531 corresponding to the shape of the frame 11, a second support part 2533 corresponding to the shape of the voice coil 23, a conductive path 2535 connecting the first support part 2531 and the second support part 2533, an external bonding pad 2537 extended by the first support part 2531 towards the outside of the frame 11 and electrically connected with the external circuit, and an internal bonding pads 2539 extended from the second support part 2533 towards the first support part 2531. The voice coil lead 235 is electrically connected with the internal bonding pads 2539, and the conductive path 2535 is electrically connected with the external bonding pad 2537 and the internal bonding pads 2539.

Figure 6:
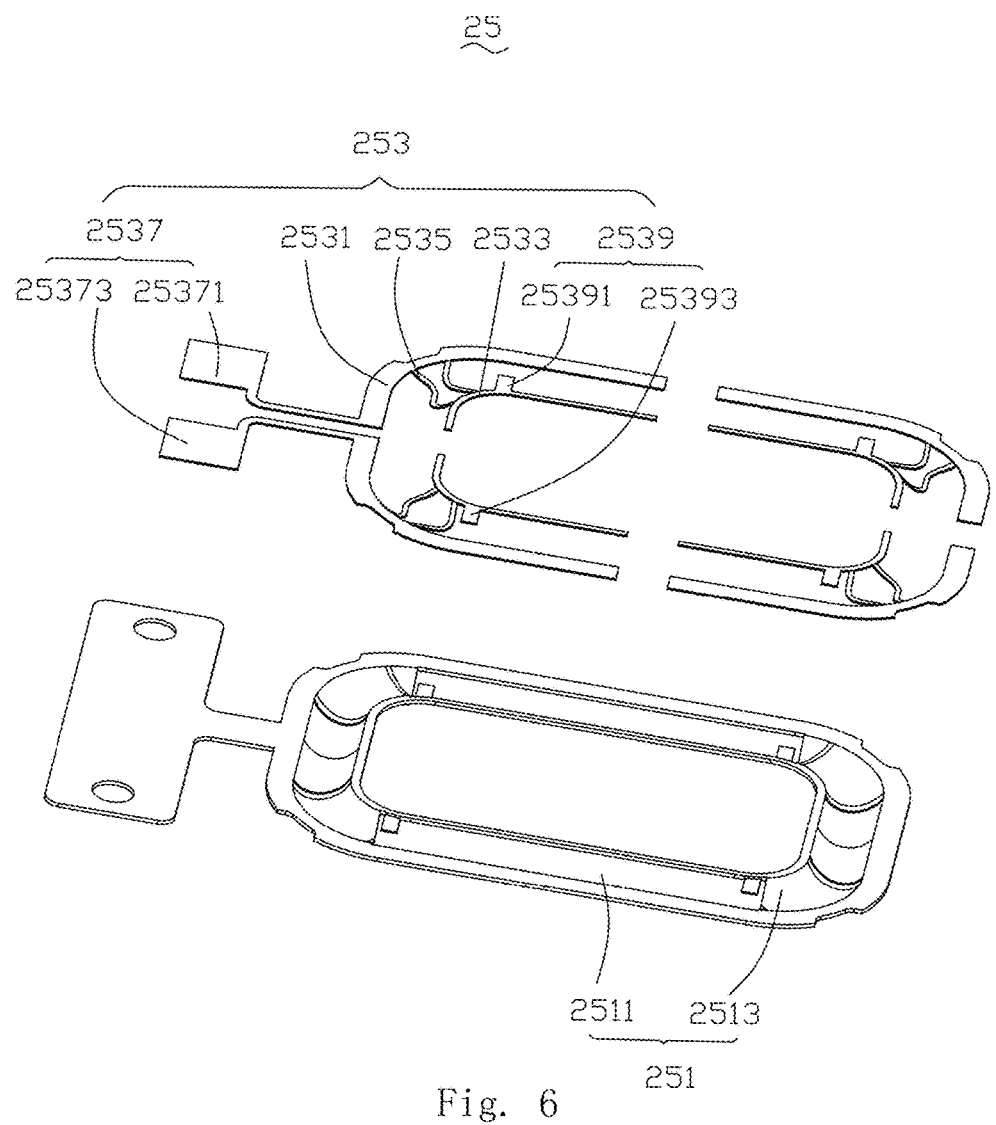
FIG. 6 is an illustration of a second diaphragm of a miniature sound generator in accordance with a second exemplary embodiment of the present disclosure.

The external bonding pad 2537 comprises a first external bonding pad 25371 and a second external bonding pad 25373 which are insulated to each other and symmetrically arranged. The internal bonding pads 2539 comprises two first internal bonding pads 25391 correspondingly connected with the first external bonding pad 25371 and two second internal bonding pads 25393 correspondingly connected with the second external bonding pad 25373, wherein the first internal bonding pad 25391 and the second internal bonding pad 25393 are insulated to each other. In the embodiment, the quantity of the first internal bonding pad 25391 and the second internal bonding pads 25393 are 2 respectively. The two first internal bonding pads 25391 are located at the same side of the direction of the long shaft, and can be connected by the second support part 2533, as shown in FIG. 5, and can also be insulated to each other, as shown in FIG. 6. In the embodiment shown in FIG. 6, the insulating body 251 is the same as the embodiment shown in FIG. 5; and the internal bonding pads 2539 far away from the external bonding pad 2537 is a false bonding pad, only used for balancing the weight at two sides to obtain more stable vibrating effect, and is not used for electrically connecting the voice coil. In FIG. 6, the conductive framework 253 is equipped with a plurality of gaps, therefore, on one hand, all parts are insulated to one another, and on the other hand, the weight of the conductive framework can be reduced, and the cost can be reduced.

The insulating body 251 is wrapped in the periphery of the first support part 2531 and the second support part 2533, the insulating body 251 comprises the suspension formed between the first support part 2531 and the second support part 2533 and comprises openings 2513 arranged on the suspension 2511. The conductive path 2535 is wrapped by the suspension 2511, therefore, the quantity of the openings 2513 is two, and both of them are arranged at one side of the two said long shaft sides 231; and the internal bonding pads 2539 are arranged in the openings 2513.

The electrical connection is realized by the voice coil lead 235 and the bonding pad 2539 by welding or other ways, the external bonding pad 2537 and the internal bonding pads 2539 are electrically connected through the conductive path 2535, and the electric signal is arrived at the external bonding pad 2537 through the internal bonding pads 2539 by passing the conductive path 2535 and then transmitted to the external circuit.

According to the miniature sound generator 100 provided by the present disclosure, the voice coil 23 is supported by arranging the second diaphragm 25 made of silica gel, thus, effectively reducing the shaking of the voice coil 23 in the direction of its long shaft sides 231, and then, improving the tone quality of the miniature sound generator 100 at the low frequency; and meanwhile, the conductive framework 253 is attached to the insulating body 251 of the second diaphragm 25, thus, avoiding arranging a conductive terminal, reducing the weight of the second diaphragm 25, improving the maximum low frequency output sound pressure of the miniature sound generator 100, and then, improving the tone quality of miniature sound generator 100.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:
1. A miniature sound generator, comprising:
a vibration system including a first diaphragm, a voice coil supporting and driving the first diaphragm to vibrate, and a second diaphragm arranged at one side of the voice coil far away from the first diaphragm and elastically supporting the voice coil;
a fixing system fixed with the second diaphragm, the fixing system including a frame supporting the second diaphragm and a magnetic circuit system arranged in the frame; wherein
the second diaphragm includes an insulating body and a conductive framework formed in the insulating body for electrically connecting with the voice coil and an external circuit;
wherein the conductive framework comprises a first support part corresponding to the frame, a second support part corresponding to the voice coil and a conductive path connecting the first support part and the second support part;
wherein the insulating body is wrapped in the periphery of the first support part and the second support part for forming a suspension between the first support part and the second support part; and the conductive path is covered by the suspension; and
wherein a plurality of openings is formed on the suspension; and in the openings, the internal bonding pads extends from the second support part towards the first support part.

2. The miniature sound generator as described in claim 1, wherein the voice coil comprises a voice coil lead, an external bonding pad extending from the first support part towards the outside of the frame and electrically connected with the external circuit, an internal bonding pad formed by the second support part for electrically connecting with the voice coil, the conductive path connects the external bonding pad and the internal bonding pads electrically.

3. The miniature sound generator as described in claim 1, wherein the voice coil comprises a pair of long shaft sides and a pair of short shaft sides for forming the voice coil; and the conductive framework is symmetrically arranged along the direction of the long shaft of the voice coil.

4. The miniature sound generator as described in claim 3, wherein the external bonding pad comprises a first external bonding pad and a second external bonding pad which are insulated to each other, and the internal bonding pads comprise a first internal bonding pads correspondingly connected with the first external bonding pad and a second internal bonding pads correspondingly connected with the second external bonding pad, further, the first internal bonding pads and the second internal bonding pads are insulated to each other.

5. The miniature sound generator as described in claim 1, wherein the magnetic circuit system comprises a magnetic bowl matched with the frame and a magnetic steel disposed on the magnetic bowl; and the magnetic steel comprises a main magnet, a pair of auxiliary magnets symmetrically arranged at two sides of the main magnet and annular magnetic conductive parts surrounding the main magnet and the auxiliary magnets.

6. The miniature sound generator as described in claim 1, wherein the conductive framework is made of copper foil.

* * * * *